United States Patent [19]

Quate et al.

[11] 3,826,865

[45] July 30, 1974

[54] METHOD AND SYSTEM FOR ACOUSTO-ELECTRIC SCANNING

[75] Inventors: Calvin F. Quate, Los Altos Hills; Oberdan W. Otto, Mountain View, both of Calif.

[73] Assignee: Board of Trustees of Leland Stanford Junior University, Stanford, Calif.

[22] Filed: Apr. 16, 1973

[21] Appl. No.: 351,272

[52] U.S. Cl. .................................. 178/7.1, 178/7.6
[51] Int. Cl. ............................................ H04n 5/30
[58] Field of Search .............................. 178/7.1, 7.6

[56] References Cited

UNITED STATES PATENTS

| | | | |
|---|---|---|---|
| 3,555,180 | 1/1971 | Cook | 178/7.1 |
| 3,617,931 | 11/1971 | Pinnow et al. | 178/7.6 |
| 3,633,996 | 1/1972 | Lean et al. | 178/7.6 |
| 3,746,867 | 7/1973 | Phela et al. | 178/7.1 |

*Primary Examiner*—Richard Murray
*Attorney, Agent, or Firm*—Flehr, Hohbach, Test, Albritton & Herbert

[57] ABSTRACT

A method and system for scanning conductivity perturbations in semiconductor films by using the piezoelectric fields of acoustic surface waves. In accordance with one embodiment, a piezoelectric substrate is situated adjacent to and spaced a small distance from a semiconductor film. A reading acoustic surface wave of relatively long pulse duration is propagated along the piezoelectric substrate in one direction and a relatively short scanning acoustic wave pulse is propagated in the opposite direction. The amplitude of the reading wave is modulated by the scanning pulse at the point where the two pass each other. In accordance with one embodiment, an optical pattern image on the semiconductor film produces conductivity perturbations through carrier-pair generation. These conductivity perturbations appear as amplitude variations in the reading acoustic wave pulse after its interaction with the scanning acoustic wave pulse, so that the electrical output from the piezoelectric substrate contains the optical information in the pattern image on the semiconductor film. Two dimensional scanning may be accomplished by successively mechanically displacing the optical pattern being scanned with respect to the semiconductor film.

20 Claims, 5 Drawing Figures

METHOD AND SYSTEM FOR ACOUSTO-ELECTRIC SCANNING

BACKGROUND OF THE INVENTION

This invention pertains to a method and system for scanning conductivity perturbations in semiconductor films and more particularly pertains to such a method and system which utilizes the piezoelectric fields of acoustic surface waves.

The simplest type of acoustic wave is a longitudinal wave, in which the material through which the wave is travelling is alternately compressed and expanded. A second type of acoustic wave is the transfer or shear wave in which material particles vibrate from side to side at right angles to the direction of travel of the acoustic signal. A third principal type of wave, the Rayleigh or surface wave, exists only near the free surface of a solid and is a composite wave incorporating both shear and longitudinal components.

Various electronic devices have been constructed which utilize acoustic waves. Among such electronic devices are acoustic filters and delay lines, for example.

The first acoustic devices employed in electronic applications made use of either longitudinal or shear waves that pass through the interior of a solid material. The advantage provided by surface waves is that the waves are accessible at the surface and can be easily excited anywhere on a surface and collected elsewhere on the same surface.

It has been known for some time that an acoustic surface wave propagating beneath a spaced semiconductor will experience attenuation due to acousto-electric coupling between the piezoelectric medium supporting the wave and the semiconductor. This effect has previously been utilized for an amplifier and also for eliminating unwanted interfering signals or filtering. For example, amplification may be obtained by allowing the electric field associated with the acoustic surface wave to interact with moving electrons. If an electron is travelling faster than the wave, there is the tendency for the electron to slow down and deliver some of its energy to the wave and hence increase the amplitude of the wave. If, on the other hand, an electron is moving more slowly than the wave, the reverse is true: the wave speeds up the electron and in the process of delivering energy to the electron the surface wave decreases in amplitude.

OBJECTS AND SUMMARY OF THE INVENTION

It is an object of this invention to scan conductivity perturbations in a semiconductor film by non-linearly interacting two acoustic surface waves in the vicinity of the semiconductor film.

It is another object of this invention to provide a method and system for converting an energetic image, such as an optical image, into an electrical signal through impinging the energetic image on a semiconductor film and scanning the conductivity perturbations in the semiconductor film through non-linearly interacting acoustic surface waves in the vicinity thereof.

Briefly, in accordance with one embodiment of the invention, an image is impinged upon a semiconductor film to cause conductivity perturbations in the semiconductor film. A relatively long reading acoustic wave pulse is propagated in the vicinity of the semiconductor film in one direction, and a relatively short scanning acoustic wave pulse is propagated in the opposite direction past the semiconductor film. The scanning pulse non-linearly interacts with the reading pulse to form an output acoustic wave pulse which is modulated or attenuated in accordance with the conductivity perturbations in the semiconductor film.

DESCRIPTION OF THE PREFERRED EMBODIMENTS

It is well established that the propagation constant, $\beta$, of a piezoelectric surface wave is perturbed by the presence of a conducting medium near the surface, thus resulting in a change in phase velocity and in attenuation of the wave. Thus referring to FIG. 1 the waveform A is indicative of the amplitude of a surface wave without any conducting medium present, and the waveform B is indicative of a reduced amplitude for the surface wave propagated next to a conducting medium. The perturbation for a given semiconductor-piezoelectric system is determined by the conductivity, and the spacing from the piezoelectric, of the semiconductor. The thickness of the semiconductor is also important when it is smaller than $1/\beta$. When a large amplitude surface wave propagates beneath the semiconductor, the r.f. piezoelectric field associated with the wave interacts with the charges in the semiconductor through the non-linearity inherent in the current density equation, $J = \rho v$ where J is current density, $\rho$ is charge density, and $v$ is charge drift velocity. This produces a static perturbation in charge density in the direction of the surface normal. Associated with this perturbation in charge density is a transverse acousto-electric field. The static perturbation of the semiconductor will appear to any other surface wave as a change in the effective conductivity and spacing. The behavior of a small amplitude signal wave can be expressed mathematically as $$S_1 = S_{10} \exp \int_0^l dx\{-\alpha(x) - j\Delta\beta_{12}\} \quad (1)$$

where $l$ is the length of the semiconductor and $S_1$ is the amplitude of the signal wave. The attenuation coefficient along the acoustic path is $\alpha(x)$ in the absence of any large amplitude acoustic waves, $\Delta\beta_{12}$ is the change in propagation constant of the signal wave produced by the presence of the large amplitude scan pulse. With moderate amplitudes $\Delta\beta_{12}$ is proportional to the square of the amplitude $S_2$ of the scan pulse; thus $$\Delta\beta_{12} = jK(x) \mid S_2 \mid^2 \quad (2)$$

where $K(x)$ is a non-linear interaction strength related to the conductivity. If $S_2$ is a short pulse, of width a, propagating oppositely to the signal wave $S_1$, then the perturbation in time of the detected signal wave becomes $$S_1(\tau) = S_{10}(\tau) \exp(-\bar{\alpha}l) \exp\{a|S_{20}|^2 K(x=v\tau/2)\} \quad (3)$$

Thus the amplitude of the detected signal wave at time $\tau$ is determined by the effective conductivity at the point $v\tau/2$ along the semiconductor.

Figure 1:
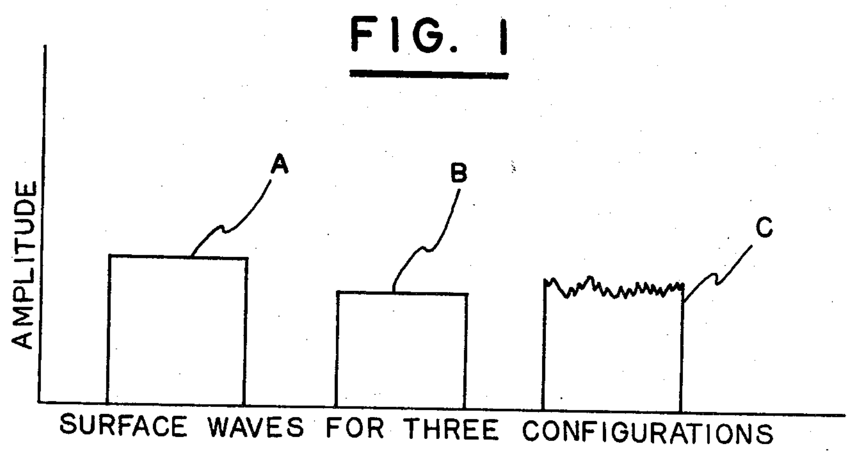
FIG. 1 is a wave diagram illustrating an acoustic wave propagated along the piezoelectric substrate when there is no semiconductor present, when there is a semiconductor present, and when there is a semiconductor present with a second acoustic wave non-linearly interacting with the first acoustic wave.

The wave form labeled C in FIG. 1 is indicative of the amplitude of a surface wave propagated next to a conducting medium where a second surface wave is oppositely propagated and non-linearly interacted with the first surface wave. As can be seen, what results is an amplitude modulated output. That is, the effect of the scanning pulse $S_2$ is to write on to the reading pulse $S_1$ the information contained in the interaction region between the two surface waves in the form of an interaction strength. This information is stored in the reading pulse $S_1$ in the sense that it remains with $S_1$ as long as $S_1$ propagates. The information can be read merely by detecting the amplitude modulated signal $S_1$.

The conductivity of a photoconducting semiconductor, such as silicon for example, can be changed locally by the presence of light. Thus, optical intensity information can be impressed upon a silicon interaction region by shining an optical pattern on it.

Figure 2:
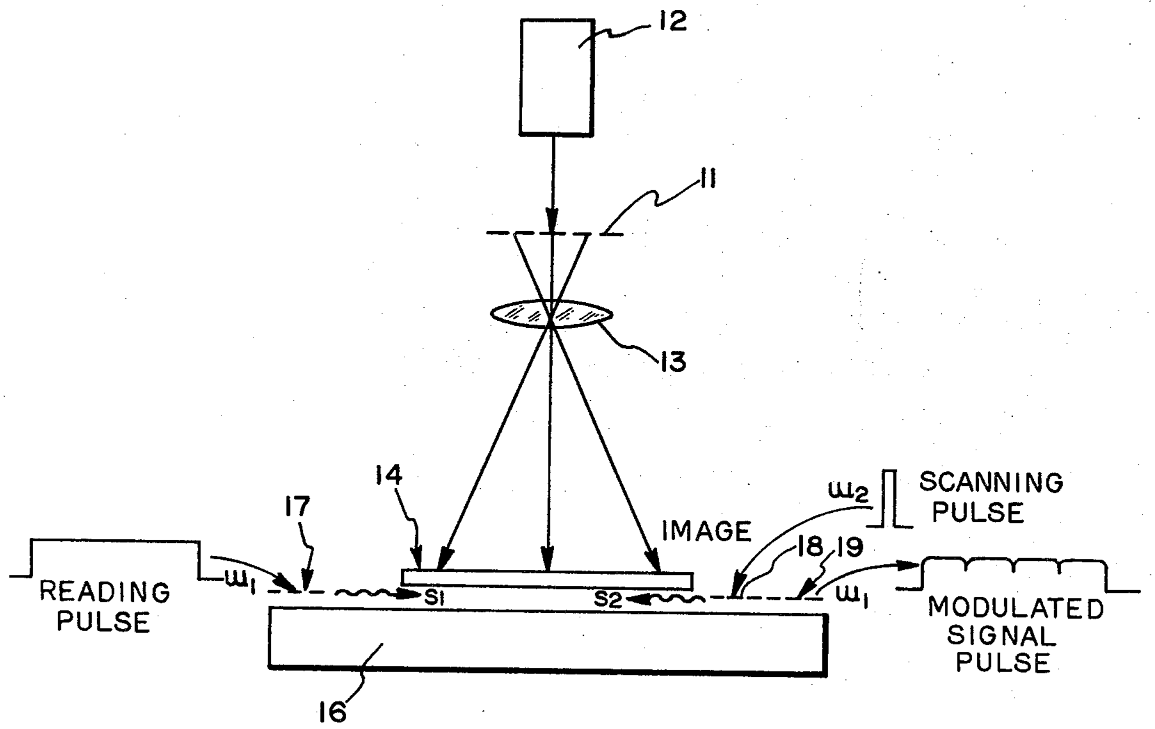
FIG. 2 is a schematic diagram of apparatus in accordance with the invention for converting an optical pattern on a semiconductor film into an electrical signal.

Referring to FIG. 2 now, there is shown in schematic form apparatus for scanning conductivity perturbations in a semiconductor film and hence an optical pattern incident thereon, through the use of acoustic surface waves. Thus an object 11 is illuminated by means such as light source 12 so that an image of the object is formed by means such as lens system 13 on the semiconductor film 14. The semiconductor film 14 may be, for example, silicon or any other photoconducting semiconductor whose conductivity can be locally changed by the presence of light. For instance, instead of using visible light infrared light might be utilized with the semiconductor film being one whose conductivity is locally changed by infrared light.

The semiconductor film 14 is spaced some distance from the top surface of a piezoelectric substrate 16. In accordance with one particular embodiment of the invention, the semiconductor film 14 has a thickness of approximately 2.5 um and the spacing between the semiconductor film 14 and the top surface of the piezoelectric substrate 16 is on the order of 1,000 A. Also in accordance with this one particular example, the piezoelectric substrate 16 is comprised of $LiNbO_3$.

An input electrode 17 is provided at one end of the piezoelectric substrate 16 for generating a first acoustic surface wave $S_1$ which may be termed a reading pulse having a frequency $\omega_1$. This reading pulse is propagated toward the right as indicated by the arrow in FIG. 2. Another input electrode 18 is provided on the top surface of the piezoelectric substrate 16 for propagating a surface acoustic wave $S_2$ which may be termed a scanning pulse having a frequency $\omega_2$. This scanning pulse is propagated to the left as shown by the arrow in FIG. 2. As the scanning pulse starts propagating to the left it first overlaps the leading edge of the reading pulse. As the scanning pulse continues on to the left it finally overlaps the trailing edge of the reading pulse. For the time in between while the scanning pulse is travelling under the silicon film it modifies successive increments of the reading pulse from the leading through to the trailing edge thereof. As discussed before, the magnitude of the modification to the reading pulse is proportional to the conductivity of the semiconductor film at the point of overlap between the two acoustic wave pulses.

The electric fields associated with the two acoustic surface waves produce currents in the semiconductor film. One possible explanation for the non-linear interaction effect which is produced by the two acoustic surface waves, is that the transverse RF electric field of the scanning pulse is rectified by the non-linearities of the semiconductor film to produce a transverse DC electric field. The transverse DC field then modulates the properties of the semiconductor which in turn affects the degree to which the reading acoustic surface wave is attenuated. Utilizing apparatus such as shown in FIG. 2 the carriers in the semiconductor film 14 are driven by the electric fields of the acoustic surface wave at the point where the scanning acoustic wave is located. That is, the transverse electrical field associated with the scan pulse forces the charge carriers in the semiconductor away from its surface and hence away from the acoustic reading pulse. This has the effect of decreasing the attenuation of the reading wave proportional to the spacing between the charge carriers and the semiconductor surface,at that point where the reading and scan pulses are interacting and thus the reading wave or pulse is accordingly amplitude modulated. Since the scanning acoustic wave or pulse is travelling through the semiconductor film 14 opposite to the reading pulse, the effective source of current generation moves through the semiconductor film with the scanning acoustic pulse. As illustrated in FIG. 2, an output electrode 19 is provided at the end of the piezoelectric substrate 16 opposite where the reading pulse is generated to detect the output acoustic wave. The output acoustic wave is the reading pulse modulated in accordance with the conductivity perturbations of the semiconductor film 14, and the output acoustic wave is converted into an electrical signal by output electrode 19. In accordance with one particular embodiment of the invention, the scanning pulse can be a one-tenth microsecond pulse with the reading pulse being a significantly longer pulse. If desired, even shorter scanning pulses may be utilized for giving increased resolution. For example, with a scanning pulse of 10 nanoseconds and utilizing a piezoelectric substrate of Lithium Niobate, the distance between peaks or amplitude variations in the modulated output signal is 35 microns. This forms a measure of the resolution capability of the method of this invention. If different materials are utilized for the piezoelectric substrate, different resolution limits result. For example, if a piezoelectric substrate of bismuth germanium oxide is utilized, a scanning acoustic pulse of 10 nanoseconds in duration has a spatial extent along the piezoelectric substrate of 17 microns, which is the resolution for that case. In general, the resolution capability of the invention is proportional to the spatial extent or width of the scanning pulse as it propagates along the surface of the piezoelectric substrate.

It should be appreciated that monolithic devices may also be constructed in accordance with the principles of this invention in which no separate discrete spacing is provided between a semiconductor and adjacent piezoelectric substrate. For example, a device in accordance with this invention can be constructed by forming a piezoelectric substrate directly on a semiconductor. Depositing a layer of ZnO a few microns thick on a silicon body works very satisfactorily.

Figure 3:
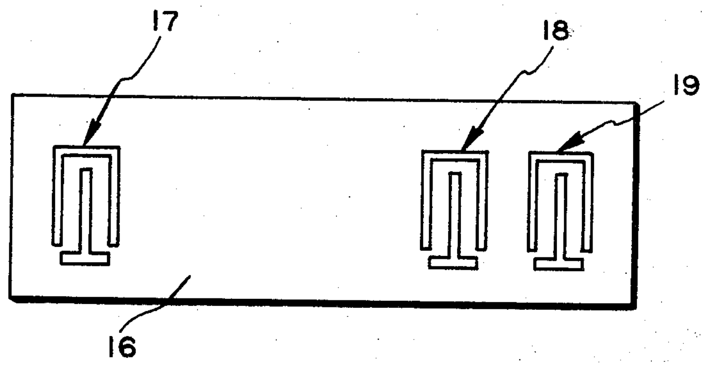
FIG. 3 is a top plan view of the piezoelectric substrate in FIG. 2 and illustrating the interdigitated electrodes thereon.

Referring now to FIG. 3, there is shown a top plan view of the piezoelectric substrate 16 of FIG. 2 and illustrating the configuration of the electrodes 17, 18 and 19. These types of electrodes are referred to as interdigital transducers and function to convert an electrical signal into an acoustic surface wave (electrodes 17 and 18) and reconvert an acoustic wave back into an electrical signal (electrode 19). Thus, electrical signals are applied to the input electrodes 17 and 18 which cause the piezoelectric substrate 16 to rapidly expand or contract so that acoustic surface waves are generated. The output electrode 19 detects the vibrations in the piezoelectric substrate 16 corresponding to the amplitude modulated reading pulse with an electrical signal generated proportional thereto across the output electrode 19.

Figure 4:
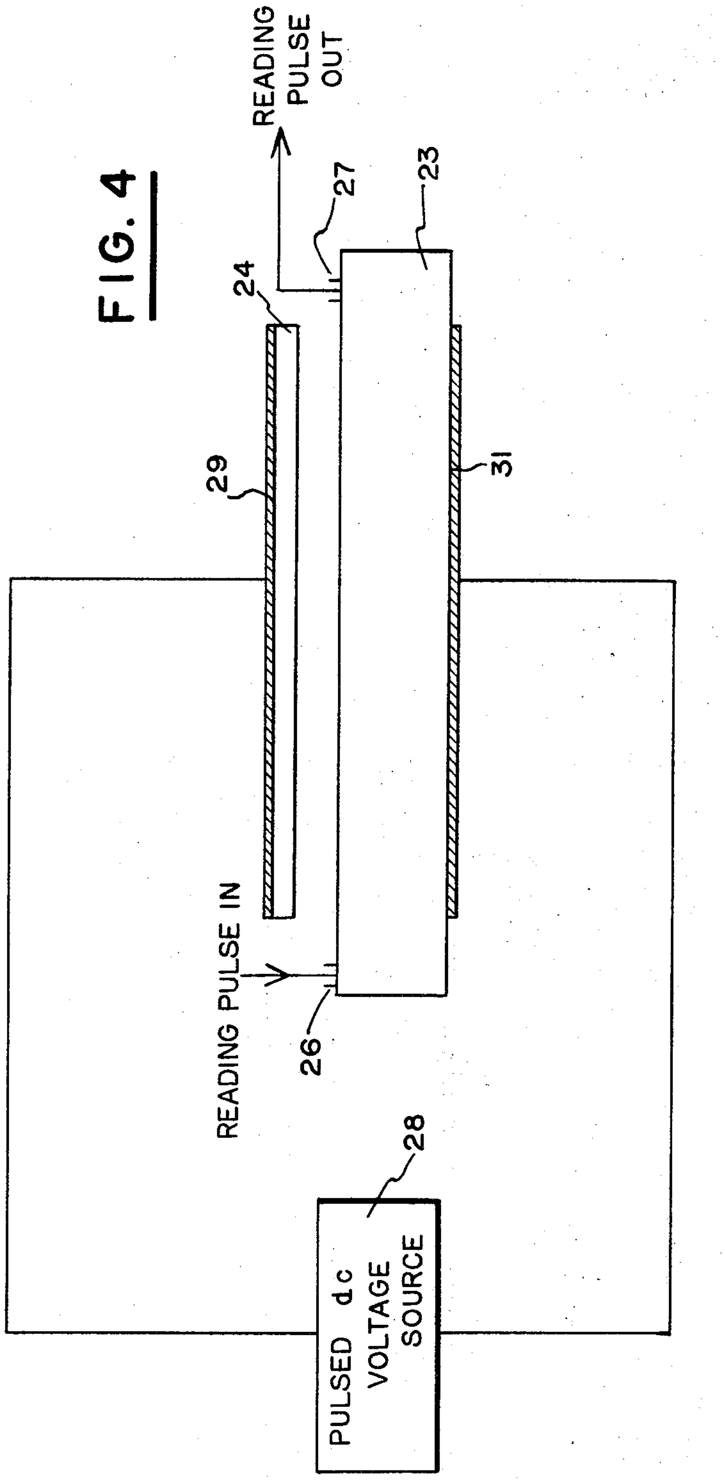
FIG. 4 is a schematic cross sectional view of another embodiment of the invention which utilizes an applied DC electrical field.

As mentioned above, in the interaction effect which is produced by the two acoustic surface waves, the transverse RF electric field of the scanning pulse is rectified by the non-linearities of the semiconductor film to produce a transverse DC electric field. The transverse DC field then modulates the properties of the semiconductor which in turn affects the degree to which the reading acoustic surface wave is attenuated. In accordance with an alternate embodiment of the invention, a reading acoustic surface wave is modulated through use of an applied DC field rather than a scanning pulse. This embodiment is shown in FIG. 4. As before, a piezoelectric substrate 23 is provided spaced some distance from a semiconductor 24. The piezoelectric substrate 23 is provided with an input electrode 26 which generates the reading acoustic surface wave and an output electrode 27 from which the modulated signal is taken. A pulsed DC voltage source 28 is provided coupled via broad area electrodes 29 and 31 across the semiconductor 24 and piezoelectric substrate 23. In accordance with this embodiment the DC voltage source 28 functions as a shutter to expose a reading acoustic surface wave to modulation due to conductivity perturbations in the semiconductor. The DC voltage source 28 is normally on so that the transverse electrical field applied by means of electrodes 29 and 31 forces the e charge carriers in the semiconductor 24 away from its surface adjacent the reading acoustic wave so that no modulation of the reading surface wave results. When the transverse electrical field is suddenly removed, the charge carriers in the semiconductor return to their normal concentration at the surface. The modulation resulting from the carrier concentration in the semiconductor is impressed on the reading acoustic wave or pulse during this interim. The transverse electrical field is then established again by reapplying voltage to electrodes 29 and 31 before the modulation information integrates over the interaction region. Thus, the shut-off period of the voltage is used as a shutter to expose the reading pulse to the signal information.

Figure 5:
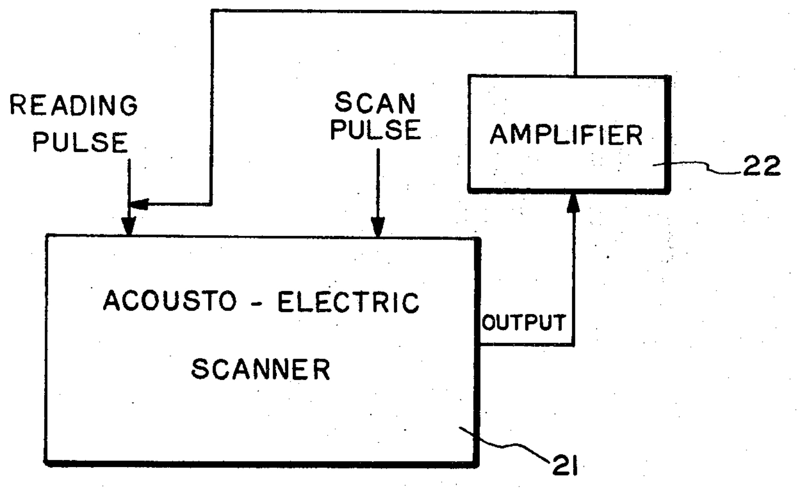
FIG. 5 is a schematic diagram of another embodiment of the invention in which an output pulse is amplified and re-cycled through the device.

If desired, information impressed upon a reading pulse can be enhanced by recycling the output pulse through the device and rescanning it multiple times. For example, referring to FIG. 5, the output pulse of the acousto-electric scanner 21 can be detected at an output transducer, amplified in an external amplifier 22 and reinjected into the input transducer. In accordance with another technique, the output pulse can be propagated on a loop delay line, amplified along the acoustic path by a surface wave amplifier, and reinjected back into the interaction region on having completed the loop. For both of the above cases the scanning surface wave pulses have to be generated at exactly the loop delay interval.

In accordance with a specific embodiment of this invention an optical "line" 10 mm. × .5 mm wide at the focal plane of the lens 13 on the semiconductor film 14 was scanned. The resulting signal output amplitude from the output electrode 19 is analogous to the output of a single horizontal sweep from a vidicon tube, for example. If an oscilloscope spot is intensity modulated by the output from the output electrode 19 as it is swept horizontally at an appropriate velocity, a replica of the optical line is produced on the oscilloscope. If the image of the object 11 being impinged upon the semiconductor film 14 is moved perpendicular to the optical line at a velocity slow compared to the .35 cm/microsecond horizontal scan (which was the scanning rate for the particular embodiment being discussed herein), successive lines of the image of the object 11 are resolved, as with a vidicon and a two-dimensional image is displayed when the oscilloscope trace is swept vertically in synchronism with the perpendicular sweep of the image.

Thus, what has been described is a method and apparatus for scanning conductivity perturbations in a semiconductor film through non-linearly interacting two acoustic surface waves in the vicinity of the semiconductor film. Utilizing an appropriate semiconductor film, not only visible images but infrared images, for example, may produce conductivity perturbations in a semiconductor film. The apparatus and method of this invention are appropriate for scanning any kind of energetic image incident on a semiconductor film where the image and the semiconductor film are related such that conductivity perturbations are introduced into the semiconductor film by the image.

It should also be pointed out that the invention has been discussed with respect to a specific embodiment, with illustrative examples given by way of specific materials and dimensions. It should be appreciated though that various modifications may be made with respect to the steps of the method and the details of the apparatus disclosed herein without departing from the true spirit and scope of the invention. For Example, in the embodiment shown in FIG. 2, the energetic image of the semiconductor past which the acoustic surface waves are propagated. Also, the scanning acoustic wave may be a pulse of long duration provided it has a sharp rise time at its leading edge (that edge which first encounters the reading wave).

We claim:

1. A method of scanning conductivity perturbations in a semiconductor film comprising the steps of propagating a reading acoustic wave in a first direction in the vicinity of the semiconductor film, propagating a scanning acoustic wave in an opposite direction in the vicinity of the semiconductor film whereby it non-linearly interacts with the reading acoustic wave to form an output acoustic wave which is attenuated in accordance with the conductivity perturbations in the semiconductor film.

2. A method in accordance with claim 1 wherein both the reading and scanning acoustic waves which are propagated are piezoelectric acoustic surface waves.

3. A method in accordance with claim 2 wherein the reading acoustic wave and the scanning acoustic wave are propagated in opposite directions adjacent the semiconductor film from opposite ends thereof and wherein the scanning acoustic wave is a relatively short pulse so that the non-linear interaction between the reading and scanning acoustic waves sequentially scans conductivity perturbations in the semiconductor film along its extent between its opposite ends.

4. A method in accordance with claim 1 including the steps of detecting the output acoustic wave and converting the output acoustic wave into an electrical signal having amplitude variations corresponding to the conductivity perturbations of the semiconductor film.

5. A method of detecting information present in an energetic image comprising the steps of impinging the image on a semiconductor film whereby conductivity perturbations are produced in the semiconductor film in accordance with the information contained in the image, propagating a relatively long reading acoustic wave pulse in the vicinity of the semiconductor film in a plane parallel to the plane of the film from one end of the film, propagating a relatively short scanning acoustic wave pulse in the plane of the reading acoustic wave pulse in the vicinity of the semiconductor film from the opposite end of the film whereby the scanning pulse non-linearly interacts with the reading pulse to form an output acoustic wave pulse which is attenuated in accordance with the conductivity perturbations in the semiconductor film.

6. A method in accordance with claim 5 wherein the image impinged upon the semiconductor film is an optical pattern whereby photons generate carriers for modulating the conductivity of the semiconductor film.

7. A method in accordance with claim 5 wherein the image impinged upon the semiconductor film is an infrared image which generates carriers for modulating the conductivity of the semiconductor film.

8. Apparatus for scanning conductivity perturbations in a semiconductor film between first and second ends thereof comprising a piezoelectric substrate adjacent to but spaced from the semiconductor film, a reading wave input electrode on said piezoelectric substrate adjacent the first end of the semiconductor film for generating a reading acoustic wave in one direction past the semiconductor film, a scanning wave input electrode on said piezoelectric substrate adjacent the second end of the semiconductor film for generating a scanning acoustic wave in an opposite direction past the semiconductor film whereby the reading and scanning acoustic waves interact to form a modulated reading acoustic waves, and an output electrode on said piezoelectric substrate for converting said modulated reading acoustic wave into an electrical output with amplitude variations corresponding to the conductivity perturbations in the semiconductor film.

9. Apparatus in accordance with claim 8 including amplifier means connected to said output electrode for amplifying said electrical output, and means coupling said amplified electrical output to said reading wave input electrode whereby conductivity perturbation information in said electrical output is enhanced by recycling said electrical output.

10. Apparatus for converting an energetic image into an electrical signal comprising a semiconductor film, means for imaging the energetic image on said semiconductor film, whereby conductivity perturbations appear in said semiconductor film, a piezoelectric substrate adjacent to but spaced from said semiconducting film, means for propagating a reading acoustic wave along said piezoelectric substrate in the vicinity of said semiconductor film in one direction, means for propagating a scanning acoustic wave along said piezoelectric substrate in the vicinity of said semiconductor film in an opposite direction whereby said reading and scanning acoustic waves non-linearly interacted to form an output acoustic wave modulated in accordance with said conductivity perturbations in said semiconductor film, and means for converting said output acoustic wave into an electrical signal.

11. Apparatus in accordance with claim 10 wherein said means for propagating said reading and scanning acoustic waves are interdigitated electrodes formed on said piezoelectric substrate.

12. Apparatus in accordance with claim 11 wherein said means for converting said output acoustic wave into an electrical signal comprises an interdigital electrode formed on said piezoelectric substrate.

13. Apparatus in accordance with claim 10 wherein said reading and scanning acoustic waves are acoustic surface wave pulses and wherein said scanning acoustic surface wave pulse has a pulse width substantially shorter than said reading acoustic surface wave pulse.

14. A method of scanning conductivity perturbations in a semiconductor comprising the steps of propagating a reading acoustic wave in a first direction in the vicintiy of the semiconductor whereby the reading acoustic wave is attenuated due to charge carriers in the semiconductor adjacent the acoustic reading wave, establishing a transverse electrical field extending into the semiconductor for modulating the charge carrier distribution in the semiconductor which in turn modulates the attenuation of the acoustic reading wave to form an output acoustic wave attenuated in accordance with the charge carrier distribution in the semiconductor.

15. A method in accordance with claim 14 wherein the transverse electrical field is established by propagating an acoustic scan pulse in the vicinity of the semiconductor.

16. A method in accordance with claim 15 wherein the acoustic scan pulse is propagated in a direction opposite the reading acoustic wave and wherein the acoustic scan pulse is a relatively short pulse so that the transverse electrical field is sequentially applied along the extent of the semiconductor as the acoustic scan pulse propagates.

17. A method in accordance with claim 14 wherein the transverse electrical field is established by application of a voltage across the semiconductor and wherein the attenuation of the acoustic reading wave due to charge carrier distribution in the semiconductor is modulated by momentarily removing the transverse electrical field.

18. Apparatus for scanning a charge carrier distribution in a semiconductor between first and second ends thereof comprising a piezoelectric substrate adjacent the semiconductor, an input electrode on said piezoelectric substrate adjacent the first end of the semiconductor for propagating a reading acoustic wave in one direction past the semiconductor, means for establishing and removing a transverse electrical field across the semiconductor whereby attenuation of the reading acoustic wave is modulated in accordance with the charge carrier distribution in the semiconductor to form a modulated reading acoustic wave and output means on said piezoelectric substrate adjacent the second end of the semiconductor for converting the modulated reading acoustic wave to a modulated electrical signal.

19. Apparatus in accordance with claim 18 wherein said means for establishing and removing a transverse electrical field across the semiconductor comprises acoustic pulse generating means for propagating an acoustic scan pulse in a second direction opposite said one direction past the semiconductor.

20. Apparatus in accordance with claim 18 wherein said means for establishing and removing a transverse electrical field across the semiconductor comprises a switchable DC voltage source coupled across the semiconductor.

* * * * *